(12) United States Patent
Gautier et al.

(10) Patent No.: US 12,429,395 B2
(45) Date of Patent: Sep. 30, 2025

(54) MULTI-PURPOSE APPARATUS FOR DETECTING AND LOCATING LEAKS OF LIQUID

(71) Applicant: TTK, Paris (FR)

(72) Inventors: Olivier Gautier, Paris (FR); Olivier Gillot, Paris (FR)

(73) Assignee: TTK, Paris (FR)

( * ) Notice: Subject to any disclaimer, the term of this patent is extended or adjusted under 35 U.S.C. 154(b) by 0 days.

(21) Appl. No.: 18/872,099

(22) PCT Filed: Jun. 13, 2023

(86) PCT No.: PCT/EP2023/065853
§ 371 (c)(1),
(2) Date: Dec. 5, 2024

(87) PCT Pub. No.: WO2023/242218
PCT Pub. Date: Dec. 21, 2023

(65) Prior Publication Data
US 2025/0164339 A1     May 22, 2025

(30) Foreign Application Priority Data
Jun. 16, 2022   (FR) ...................................... 2205914

(51) Int. Cl.
*G01M 3/16*     (2006.01)
(52) U.S. Cl.
CPC .................................. *G01M 3/165* (2013.01)
(58) Field of Classification Search
None
See application file for complete search history.

(56) References Cited

U.S. PATENT DOCUMENTS

2011/0295504 A1   12/2011   Barber et al.
2016/0156996 A1*   6/2016   Balatchev ................. F17D 5/06
                                                                    340/10.4

(Continued)

FOREIGN PATENT DOCUMENTS

EP     2330397 A1    6/2011
EP     3066443 B1    5/2017
FR     2773613 A1    7/1999

OTHER PUBLICATIONS

International Preliminary Report on Patentability and amended claims received for PCT/EP2023/065853, mailed Sep. 10, 2024. [Foreign Language Copy, English Translation and Translator Declaration attached].

(Continued)

*Primary Examiner* — Alexander A Mercado
(74) *Attorney, Agent, or Firm* — Greer, Burns & Crain, Ltd

(57) ABSTRACT

A system for detecting leaks of liquid is disclosed, including a central management unit and a plurality of linear sensors, each of the linear sensors including at least one communication element including at least one electronic communication module and at least one linear conductor that are connected together to form a communication bus. The linear sensors are arranged so that the communicating elements of the linear sensors form a first linear interrogation bus having two ends, the first linear interrogation bus being connected to the central management unit by at least one of its ends, and in that the central management unit interrogates the plurality of linear sensors by transmitting interrogation signals and receiving response signals via the two ends of the first linear interrogation bus.

12 Claims, 4 Drawing Sheets

(56) References Cited

U.S. PATENT DOCUMENTS

2017/0261383 A1* 9/2017 Sommervogel .......... G01K 7/16
2024/0035916 A1* 2/2024 Duchaigne .............. G01M 3/18

OTHER PUBLICATIONS

International Search Report and Written Opinion received for PCT/EP2023/065853, mailed Aug. 30, 2023.
Second Written Opinion received for PCT/EP2023/065853, mailed Dec. 19, 2023.
International Preliminary Report on Patentability and amended claims received for PCT/EP2023/065853, mailed Sep. 10, 2024. [Translator Declaration attached].

* cited by examiner

[Fig. 1]
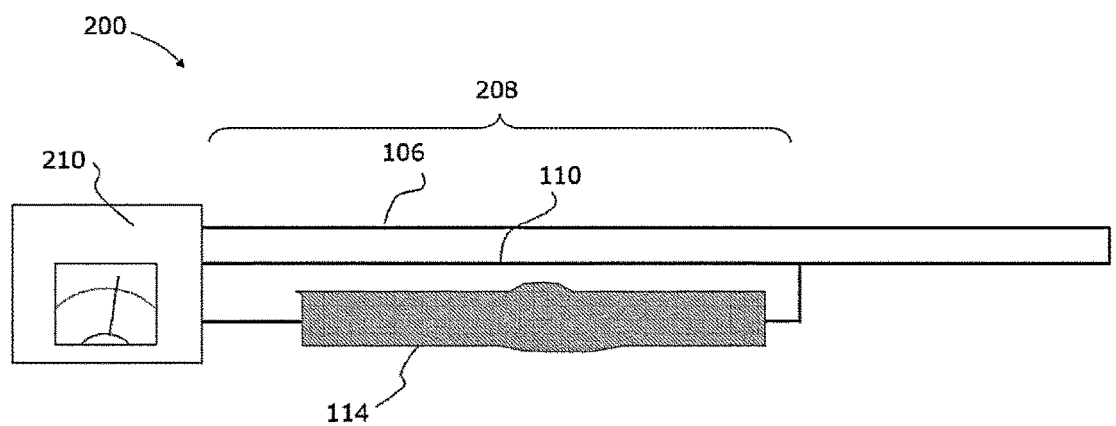
[Fig. 2]
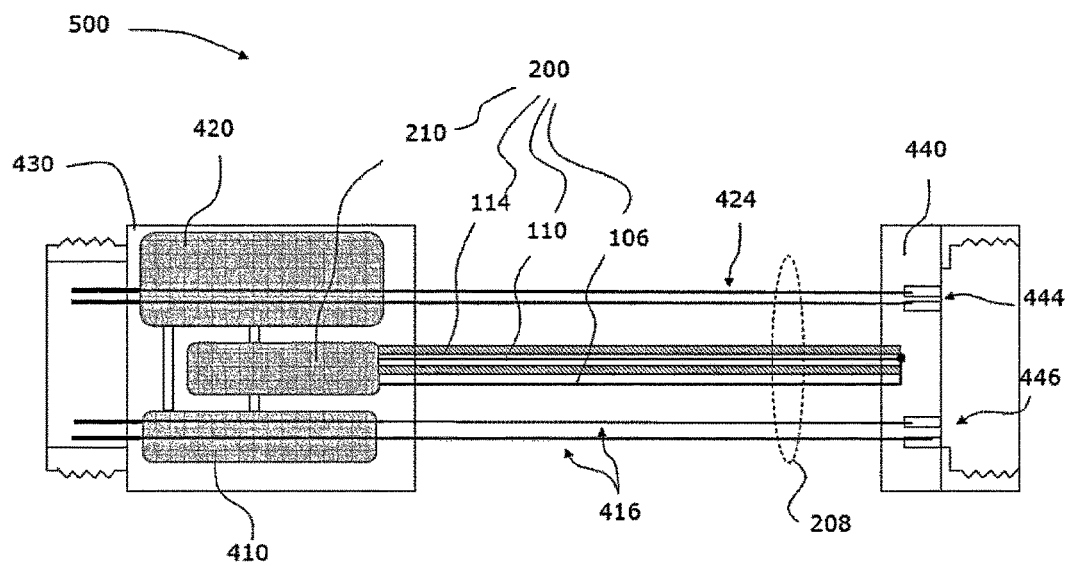

[Fig. 3]
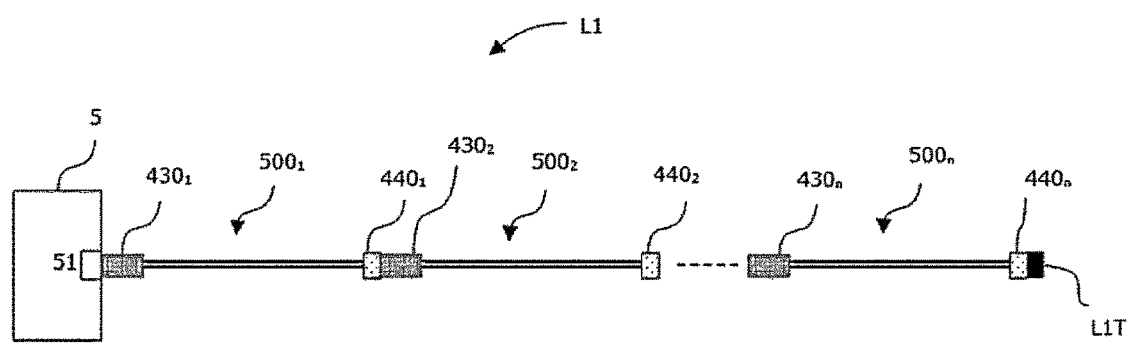
[Fig. 4]
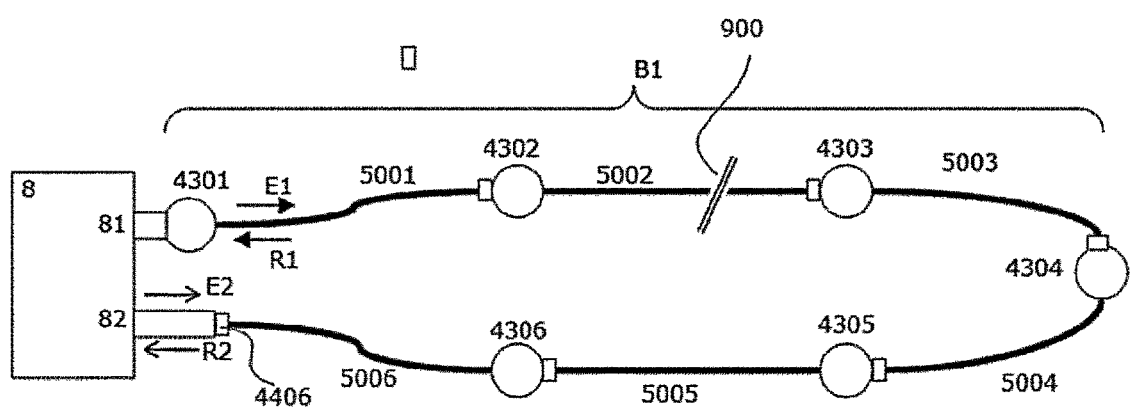

[Fig. 5]
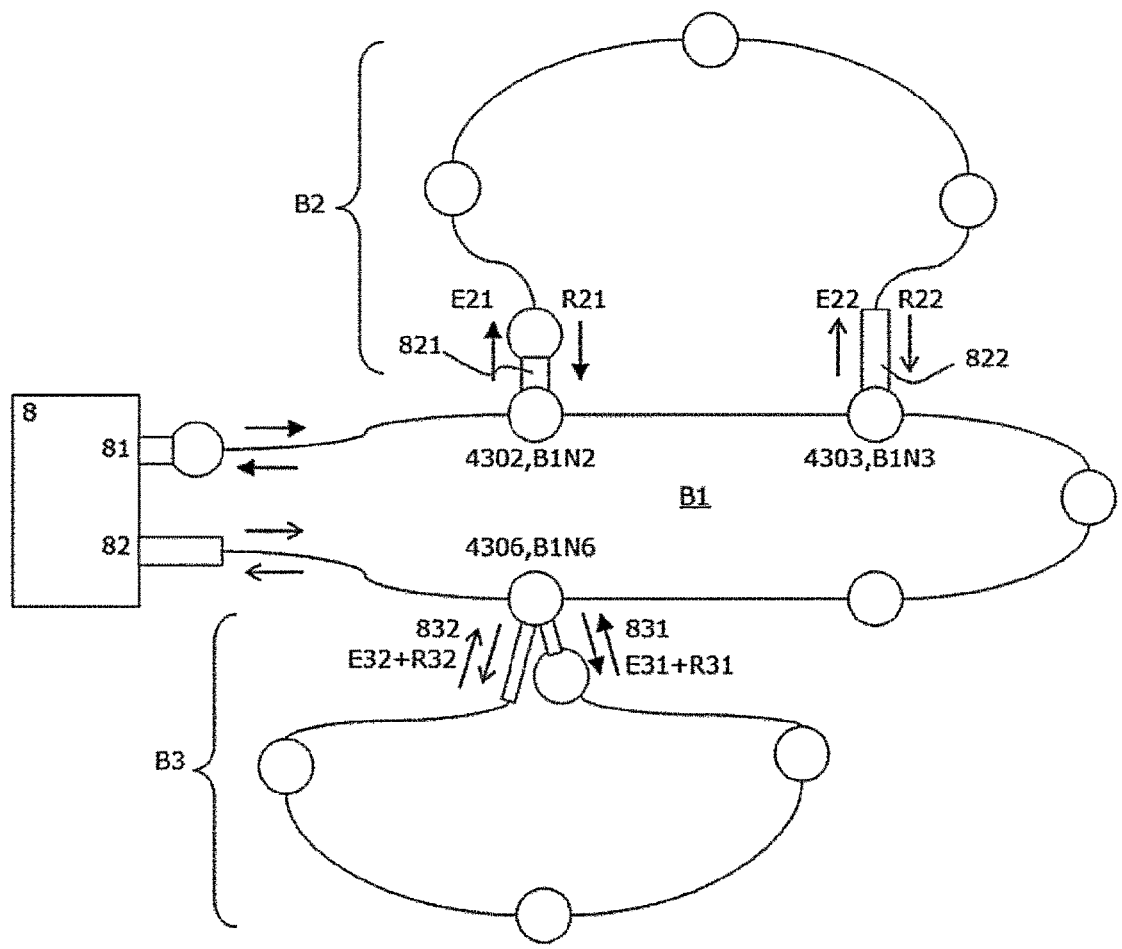

[Fig. 6]
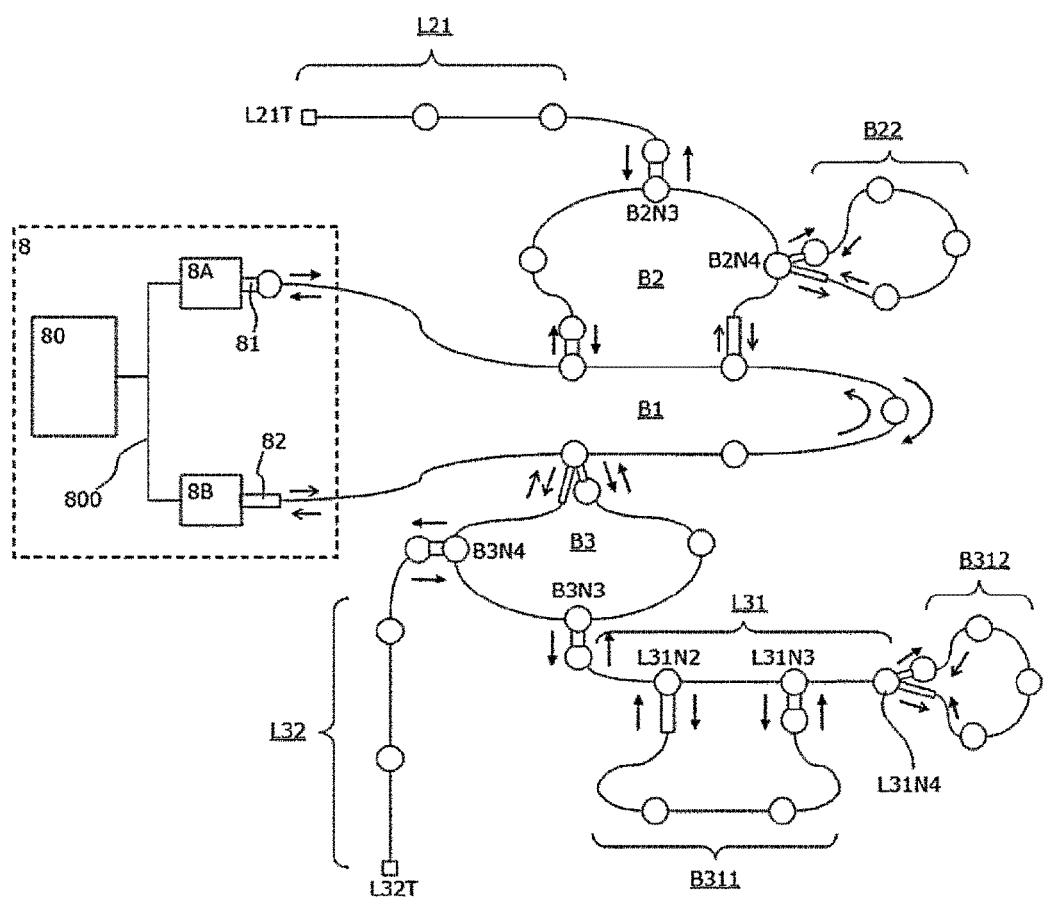

MULTI-PURPOSE APPARATUS FOR DETECTING AND LOCATING LEAKS OF LIQUID

BACKGROUND

The present invention relates to a system for detecting leaks of liquid. It also relates to a method for detecting leaks of liquid.

To detect liquid leaks over long distances, such as oil or water pipelines, or over large surfaces, such as industrial premises or computer rooms, it is known to install linear sensors connected together in series to form a sensing line.

In such a sensing line, each sensor comprises an elongated portion which includes, along all or part of its length, means sensitive to the liquid(s) to be sensed. The sensors also comprise a communication bus in their elongated part, which are connected together to form a query bus running the entire length of the sensing line. The end of the sensing line is connected to a central management unit.

Such a sensing line, in a hydrocarbon-sensitive version, is disclosed in document EP3066443. Other sensing modes are known, for example with sensitivity to conductive liquids such as water, as disclosed in documents FR2773613 and EP09306176.

It is still desirable to improve these types of detectors and installations, particularly in terms of reliability, cost and performance, to enable them to cover larger, more varied areas, in a way that is more flexible to install, maintain, manage or replace.

One aim of the invention is to compensate in whole or in part for the disadvantages of the state of the art, in particular by improving their performance on these different points or the compromises between these different performances.

SUMMARY

This objective is achieved with a system for detecting leaks of liquid, comprising a central management unit and a plurality of linear sensors each comprising a first end and a second end and which are connected to one another in series.

According to the invention, the plurality of linear sensors, connected together, form a linear query bus having a first and a second end, said linear query bus being connected to the central management unit by at least one of its ends.

The central management unit is designed to, the at least one end of the linear query bus:
send at least one query signal via the linear query bus and receive at least one response signal from the plurality of linear sensors via said end, communication between the linear query bus and the central management unit being two-way in such a case.

The system for detecting leaks of liquid may comprise multiple central units, said central units being connected to one another via a wireless network (e.g. WiFi) or via a wired connection (e.g. Ethernet or Modbus).

The advantage of this system is that communication between the linear query bus and the central management unit is two-way. "Two-way" means that the query signals and response signals are received by the same end of said linear query bus, for both ends of said linear query bus. The central management unit sends query signals to both ends of the linear query bus, one end at a time. This is because the central management unit waits to receive response signals from the first end of the linear query bus before sending query signals to the second end of the linear query bus.

Communication between the central management unit and the linear query bus is advantageously achieved via a communication element comprised within each linear sensor. The communication element comprises at least one electronic communication module and one or more linear sensors, with the linear sensors connected together to form a communication bus.

The linear query bus can also form a sensing line which can be functionally connected to said central management unit directly or indirectly.

The system can also comprise at least one accessory corresponding to a branch and/or a terminator and/or a neutral cable.

"Branch" refers to an element that allows the addition of at least one second element, typically a linear sensor.

"Terminator" refers to an end-of-line element indicating the end of a series wiring of linear sensors, in order to distinguish a linear sensor break or discontinuity.

"Neutral cable" refers to a cable that connects two remote sensors/branches without adding functionality.

"Element" refers to either a branch, a terminator or a neutral cable. Accessories are not limited to the above list.

There are several types of branch, such as a straight branch, a loop branch and/or a length branch.

"Straight branch" refers to a branch that allows the addition of branched linear sensors and accessories in series without return.

"Loop branch" refers to a branch that allows the addition of branched linear sensors and/or accessories to the loop (wiring with return to the branch).

"Length branch" refers to a branch that allows the addition of a branched linear sensor of any length in series without return. This accessory makes it possible to integrate linear sensors with undefined feed lengths into the system. The branch then measures the length of the linear sensor. The branch sends the information back to the central unit.

These accessories can be used to create unique systems or networks adapted to the sensing zone. The network can then be modulated according to need.

The linear query bus can be connected at both ends to the central management unit.

The central management unit can also be arranged to compare at least a first series of response signals obtained by the first end of the linear query bus with:
a second series of response signals obtained by the second end of the linear query bus,
a list of data characterizing the plurality of linear sensors, said list being stored by said central management unit, the central management unit by deducing the presence or absence of a break in one of the linear sensors on the linear query bus.

The advantage of this system is then to define via the communication between the linear query bus and the central management unit whether one of the linear sensors of said linear query bus has a break or not. This break is identified by the central management unit by comparing the response signals received by each end of the linear query bus.

Advantageously, the response signals comprise a unique identifier enabling the central management unit to identify each sensor and/or accessory and thus determine which linear sensor is broken or not. The response signals can also include data characterizing each linear sensor and/or accessory.

The central management unit can be arranged to compare a first series of response signals obtained comprising data from a first end of said linear query bus and/or accessories with:

a list of data that characterize the plurality of linear sensors and/or accessories stored by said central management unit, and/or a second series of response signals obtained by the second end of the linear query bus, comprising data that characterize said linear sensors and/or accessories.

A position of said break of one of the linear sensors of the linear query bus can be defined by the central management unit if it deduces the presence of a break in one of the linear sensors of the linear query bus depending on the first and second series of response signals received.

In fact, depending on the data comprised in a response signal sent by a linear sensor and/or a branch to the central management unit, the central management unit is arranged to define the position of the break within the linear query bus. The central management unit compares the response signals received by each end of the linear query bus to define the position of the break.

The system may also comprise at least two branches, the at least two branches being connected on the linear query bus, a second linear query bus being formed by a second plurality of linear sensors connected in series with each other, said second linear query bus having a first and a second end and being connected to the at least two branches at both its ends.

For each end of the second linear query bus, each branch can be arranged to:

send at least one query signal via the second linear query bus and receive at least one response signal from the second plurality of linear sensors via said end, each branch also being arranged to transmit the at least one response signal received from the second plurality of linear sensors to the central management unit via the linear query bus.

The at least one response signal may also comprise data corresponding to the branch or to any other accessory present in the system.

The number of branches is non-limiting. It is assumed here that the linear query bus corresponds to a rank-one loop. When branches are integrated into this rank-one loop, the second linear query bus connected to said branches forms a rank-two loop. Multiple rank-two loops can be integrated onto a rank-one loop.

Here, each branch plays the same role as the central management unit.

The advantage of the branch is that it is configured to transmit the data received from the higher-ranking loop(s) to the lower-ranking structure(s) or directly to the central management unit, as well as the data relating thereto. The branch then sends the response signals from the second query bus and its response signal through the linear query bus, that is, the rank-one loop, so that said response signals reach the end of the central management unit that sent the query signal.

A rank-two loop may also be carried by a single line of linear sensors which is connected to and queried by the central management unit at only one of its ends.

In the case of a single line, the central management unit does not compare response signals to determine whether or not there is a break in the line. The central management unit is able to determine from which linear sensor there is an interruption, as the response signals stop at the last functional linear sensor.

"Functional linear sensor" means a sensor that is supplied with power from its first end to its second end without interruption. A linear sensor with a break and/or interruption can be supplied with power from only one end. In this case, the powered end can send a reply signal in response to the query signal. The user can then determine which linear sensor has suffered a break and/or interruption and/or damage, for example.

The at least one accessory of the system can be arranged to transmit at least one response signal further comprising an item of data specific to said accessory.

Each linear sensor may comprise a liquid-sensitive sensing member, said sensing member having a change in resistivity when in contact with said liquid.

When sensing a conductive liquid, such as water/basic acid, the resistivity of the sensing member decreases on contact with said liquid. When sensing a non-conductive liquid such as a hydrocarbon or solvent, for example, the resistivity of the sensing member increases on contact with said liquid.

Linear return conductors can typically correspond to a measurement return wire and a continuity wire.

The plurality of linear sensors of the linear query bus may correspond to a plurality of linear sensors sensitive to conductive liquids and/or sensitive to non-conductive liquids and/or sensitive to hydrocarbons.

The same applies to the second linear query bus. The types of linear sensors can be mixed and matched to suit the installation area and detection requirements.

Depending on the data comprised in a response signal sent by a linear sensor and/or an accessory to the central management unit, the central management unit is arranged to define the position of the fluid detection by a linear sensor within the linear query bus. The central management unit compares the response signals received by each end of the linear query bus and/or by each accessory to define the position of the sensor in question.

In yet another aspect of the invention, a method is proposed for detecting leaks of liquid within a system, the system comprising a central management unit and a plurality of linear sensors, each comprising a first end and a second end and which are connected to one another in series.

According to the invention, the plurality of linear sensors, connected together, form a linear query bus having a first and a second end, said linear query bus being connected to the central management unit by at least one of its ends, for the at least one end of the linear query bus, the method comprising the following steps:

sending at least one query signal via the linear query bus and receiving at least one response signal from the plurality of linear sensors via said end, the communication of the first linear query bus through the plurality of linear sensors is two-way in such a case.

The linear query bus can be connected at both ends.

The method may further comprise the following steps:

comparison by the central management unit of at least a first series of response signals obtained by the first end of the first linear query bus with:

a second series of responses obtained from the plurality of linear sensors via the second end of the first linear query bus, and/or, a list of data characterizing the plurality of linear sensors, said list being stored by said central management unit, deduction by the central management unit of the presence or absence of a break in the first linear query bus.

The system may further comprise at least one accessory corresponding to a branch and/or a terminator and/or a neutral cable, the method may equally comprise the following steps:

comparison by the central management unit of at least one first series of response signals obtained comprising data from a first end of said linear query bus and/or accessories with:
a list of data that characterize the plurality of linear sensors and/or accessories stored by said central management unit, and/or
a second series of response signals obtained by the second end of the linear query bus, comprising data that characterize said linear sensors and/or accessories.

The method may further comprise the following step:
determination of a position of said break of one of the linear sensors of the linear query bus by the central management unit, if the central management unit deduces the presence of a break in one of the linear sensors of the linear query bus depending on the first and second series of response signals received.

The system may also comprise at least two branches, the at least two branches being connected to the linear query bus, a second linear query bus being formed by a second plurality of linear sensors connected in series with each other, said second linear query bus having a first and a second end and being connected to the at least two branches at both its ends,
for each end of the second linear query bus and for each branch, the method may comprise the following steps:
sending at least one query signal via the second linear query bus and receiving at least one response signal from the second plurality of linear sensors via said end, transmitting the at least one response signal received from the second plurality of linear sensors to the central management unit via the linear query bus.

The method may further comprise the following step:
transmitting at least one response signal also comprising an item of data specific to said accessory, by said accessory.

According to another aspect of the invention, also proposed is a computer program comprising instructions which, when the program is executed by a computer, cause the latter to implement the steps of the method according to the invention.

BRIEF DESCRIPTION OF THE DRAWINGS

Other benefits and features shall become evident upon examining the detailed description of entirely non-limiting embodiments and implementations, and from the following enclosed drawings:

FIG. 1 is a symbolic diagram showing an example of a detection element of a linear sensor for use in the context of the invention, here of the water/acid detection type;

FIG. 2 is a symbolic diagram showing an example of a linear sensor for use in the context of the invention, and including a detection element from FIG. 1, of the same type or operating according to a different detection mode;

FIG. 3 is a symbolic diagram showing an example of a sensing line, including the linear sensor of FIG. 2, here connected in a single line and without a downstream circuit;

FIG. 4 is a symbolic diagram showing a first example of one embodiment of the invention, using, for example, linear sensors such as the one shown in FIG. 2, forming a single loop;

FIG. 5 is a symbolic diagram showing a second example of one embodiment of the invention, wherein the loop of FIG. 4 comprises branch nodes carrying two secondary loops;

FIG. 6 is a symbolic diagram showing a third example of an embodiment of the invention, wherein the secondary loops of FIG. 5 themselves carry downstream circuits, comprising a rank-three loop and two rank-three single lines, one of which itself carries downstream two rank-four loops.

DETAILED DESCRIPTION

FIG. 1 and FIG. 2 show an example construction of a linear sensor for use in the context of the invention.

However, other types of linear sensors connected in series can be used within the scope of the invention, with all types of sensing modes, and all types of communication and/or power bus.

Different linear sensors can also be used together within the scope of the invention, provided that their communication buses are compatible with one another and with the central management unit.

In this example, each linear sensor comprises a sensing element 200, shown in FIG. 1. This sensing element comprises a management module 210, which is connected to the proximal end of a sensing member 208 elongated along the entire length of the linear sensor 500. This sensing member 208 forms a bundle comprising two metallic conductors 106 and 110 and two sensing conductors 114, which are electrically connected together at the opposite end, called the distal end. This sensing element can be used for water/acid base detection, for example. In other types of detection, such as hydrocarbon detection, the sensing element is different.

As shown in FIG. 2, in addition to the sensing element 200, the linear sensor 500 comprises a communication element which includes, on one hand, at least a communication conductor 416 and two power conductors 424 running along the entire length of the linear sensor 500. At the end of the linear sensor 500, a connector 430 encloses the electronic management module 210. It further comprises a communication module 410 and a power module 420, which are connected to the communication 416 and power 424 conductors, forming a powered communication bus therewith. This powered communication bus comprises two 416 communication conductors (one of which is shown here in dotted lines and the other is not), each of which is used for communication in both directions.

Each linear sensor 500 carries a connector 440 at its distal end. This comprises connection ports 444 and 446, enabling the distal end of its power 424 and communication 416 conductors, respectively, to be connected to the proximal end of another linear sensor of the same type. The positions of the connectors 430 and 440 are not limiting. In some embodiments, the connector 440 is positioned on the proximal end of the linear sensor 500 and the connector 430 on the distal end of the linear sensor 500, for example.

According to FIGS. 2 and 3, in each linear sensor, the communication module 410 receives the query signal from the upstream central management unit via a communication port 436 on its proximal connector 430. It then queries its management module 210 to find out if a break has occurred. It sends this response signal upstream to the central management unit, and transmits a query signal to the next linear sensor. When it receives a response signal from one of the following linear sensors downstream, it transmits it upstream to the central management unit.

The central unit thus queries all the sensors on the sensing line, and receives the response signals from all of them via its communication port or query port 51.

As also shown in FIG. 3, multiple sensors 500(1) to 500(n) of this type can be connected in series to form a sensing line L1. In this example, the sensing line L1 is connected at its proximal end 430(1) to a communication port 51 on the central management unit 5, and receives a terminator L1T at its distal end 440n.

In this configuration, referred to here as "single line", the central management unit 5 sends a query signal to all the linear sensors in the single line, as well as to the accessories (in this case the terminator), which is received by each communication module 410 of each proximal connector and by each accessory. If no break exists on the single line, all linear sensors and accessories respond to the query signal by sending a response signal to the central management unit. If there is a break in the single line, all properly powered linear sensors respond to the query signal sent by the central management unit.

If, for example, there is a break on sensor 500(7), all the linear sensors positioned before said linear sensor 500(7) respond to the query signal from the central management unit. If the sensor 500(7) is powered at its distal end 430(7), then said linear sensor 500(7) also responds to the query signal. No response signal can be sent by the linear sensors following said linear sensor 500(7). The central management unit then determines that the break is located on linear sensor 500(7).

It should be noted that the linear sensors shown here by way of example carry their electronic modules at one end. But their structure can also be different or even varied, for example with electronics in the middle of the length, or at both ends. The sensing conductors 114 are shown here by way of example as present along the entire length of the linear sensor, but they may also have a different or even varied shape or distribution, without going beyond the scope of the invention.

FIG. 4 shows a first example of the invention, wherein a set of sensors 5001 to 5006 (here six by way of example, but this number is not limited) are connected together in series, to form a loop, here called a single loop, which is connected at both its ends 4301 and 4406 to the central management unit 8. This loop corresponds to a level one loop. This loop also forms a linear query bus.

This loop uses, for example, linear sensors such as the one shown in FIG. 2, without this being in any way limiting with respect to the types of linear sensors that can be used.

The central management unit 8 carries a first query or communication port 81 and a second query or communication port 82. The first linear sensor 5001 of the linear query bus is connected to the first query port 81 via its proximal connector 4301. The last linear sensor 5006 is connected by its distal connector 4406 to the second query port 82.

The first query port 81 of the central management unit 8 queries all the linear sensors in the loop B1 by transmitting a first query signal E1. It receives a first series of response signals R1 sent back by all the linear sensors, in response to this first query signal E1. Once all the response signals have been received by the query port 81, the second query port 82 of the central management unit 8 also queries all the sensors in the loop B1, transmitting a second query signal E2. It receives a second series of response signals R2 sent back by all the linear sensors in the loop B1, in response to this query signal E2.

The query signals E1, E2 and response signals R1, R2 are transmitted by each of the linear sensors in the loop B1 independently of one another. The loop B1 is traversed by two queries/answers: E1-R1 on the one hand, and E2-R2 on the other.

The central management unit 8 then compares the response signals from both ends. If no break or fault is present on the linear query bus, the central unit finds no difference when comparing response signals.

In the event of a break 900 or a failure on one of the linear sensors (here 5002) of the linear query bus, the linear sensor in question 5002 is able to respond either upstream or downstream, its management module remaining supplied by the upstream or downstream side of the loop (case of a single break). The first query port 81 therefore receives a response signal from upstream linear sensors, in this case the response signal from the linear sensor 5001 and, if the linear sensor 5002 is supplied from upstream in the direction of query E1, the response signal from the linear sensor 5002. The subsequent ones do not receive the first query signal E1, and cannot respond to it. Once all the response signals have been received by the query port 81, the second query port 82 queries the linear sensors of the linear query bus from the other end of the loop B1, and receives the response signals from the linear sensors which are upstream of the break/failure 900 with respect to the direction of the query signal E2. It therefore receives response signals from all the other linear sensors 5006, 5005, 5004 and 5003 in the same loop B1. And if the linear sensor 5002 is supplied from upstream in the query direction E2, the response signal from the linear sensor 5002. The power bus is configured so that each module 4301 to 4306 is supplied from both upstream and downstream.

Thus, in contrast to the embodiment of FIG. 3, the central management unit 8, which queries the linear query bus it sees downstream, receives response signals from all the linear sensors still in operation.

Additionally, the dual query bus E1-R1 (solid arrows) and E2-R2 (hollow arrows) is organized so that the central management unit 8 can identify the linear sensor at the origin of each response. For example, whatever the query signal E1 or E2 that the central management unit receives, the communication modules of the linear sensors 5001 to 5006 are arranged to transmit their response signals with at least one identification datum, which enables the central unit 8 to identify the sensor at the origin of each response.

In the event of a break or failure, for example deduced by the central management unit 8 from the fact that it is not receiving enough response signals or that it is receiving only one from each linear sensor instead of two, the central management unit 8 will identify which response signals are arriving via each of its query ports 81 and 82. In the example of break 900 in FIG. 4, the first query port 81 receives the response signal from the first linear sensor 5001, and if the linear sensor 5002 is powered from upstream in the query direction E1, the response signal from the linear sensor 5002. The second query port 82 receives the response signals from the linear sensors 5003 to 5006 and, if the linear sensor 5002 is powered from upstream in the query direction E2, the response signal from the linear sensor 5002. The central management unit 8 compares the response signals received by each query port of the central management unit and deduces that the faulty linear sensor is the linear sensor located between the last linear sensor of the first bus E1-R1 and the last linear sensor of the second bus E2-R2, and is therefore the linear sensor 5002. In the event of multiple breaks or faults, the central management unit 8 determines which part of the loop B1 is not responding on the same principle.

FIG. 5 shows a second example embodiment of the invention, which will only be described in terms of its differences.

In this example, the linear query bus connected to the central management unit 8 via its two query or communication ports 81, 82 comprises three branch accessories B1N2, B1N3 and B1N6, which receive two secondary loops.

These branches B1N2, B1N3 and B1N6 are formed by a branch electronic module, which is arranged to receive a connection of one or more linear sensors, potentially of the same type but not necessarily.

In this example, each of these branches is connected to one of the ends of a linear sensor. The connector 4302 thus is connected to a branch B1N2, the connector 4303 to a branch B1N3, and the connector 4306 to a branch B1N6.

Within a linear sensor, each of the branch module(s) is functionally connected to the communication module 410, which transmits to it the query signals E1, E2 it receives, in addition to transmitting them to the adjacent linear sensor. The branch module is arranged to transmit the query signal to a branched linear sensor via a junction box.

In this way, the linear query bus (referred to as the rank-one loop or loop B1) carries a so-called simple branch B1N2, fitted with a junction box 821 to which one of the ends of a second linear query bus (referred to as the rank-two loop or loop B2) is connected. The primary loop B1 also carries a second single branch B1N3, fitted with a second junction box 822 to which the second end of the secondary loop B2 is connected. Each network branch and/or accessory sends a response signal comprising data specific to said branch and/or accessory at the same time as it transfers response signals from the second linear query bus to the central management unit.

Through this junction box 821, the branch module of branch B1N2 echoes, in the form of first query signals E21 in loop B2, the first query signals E1 received in the connector 4302 and sent by the query port 81. The branch B1N2 is also designed to receive, via its junction box 821, response signals R21 sent by the linear sensors of the loop B2 in response to the query signals E21, and to pass them on in the primary loop B1 in the form of response signals R1. The response signals R21 are transmitted to the query port 81 of the central management unit that transmitted the query signals.

Through this junction box 822, the branch module of branch B1N3 echoes, in the form of first query signals E22 in loop B2, the first query signals E2 received in the connector 4303 and sent by the query port 82. The branch B1N3 is also designed to receive, via its junction box 822, response signals R22 sent by the linear sensors of the loop B2 in response to the query signals E22, and to pass them on in the primary loop B1 in the form of response signals R2. The response signals R22 are transmitted to the query port 82 of the central management unit that transmitted the query signals.

This primary loop B1 also carries a third, so-called double, branch B1N6. The latter operates in the same way as the single branches, with the difference that it combines and manages both a first junction box 831 and a second junction box 832, to which the two ends of a second secondary loop B3 (also of rank two) are connected. Each of these junction boxes 831, 832 transmits first and second query signals E31 and E32, and receives first and second response signals R31 and R32.

As can be seen, the first and second junction boxes of said branch B1N6 of the loop B1 are viewed by the loops B2, B3 in a similar way to the query ports 81, 82 of the central management unit 8.

The branch B1N6 is therefore designed to receive, via its junction box 831, response signals R31 sent by the linear sensors of the loop B3 in response to the query signals E31, and to pass them on in the primary loop B1 in the form of response signals R1. The response signals R31 are transmitted to the query port 81 of the central management unit that transmitted the query signals.

The branch B1N6 is also designed to receive, via its junction box 822, response signals R32 sent by the linear sensors of the loop B3 in response to the query signals E32, and to pass them on in the primary loop B1 in the form of response signals R1. The response signals R32 are transmitted to the query port 82 of the central management unit that transmitted the query signals.

This means that numerous topologies can be created, combining loops of different ranks, in a highly flexible way, both in terms of the areas to be monitored and in terms of installation modifications during its lifetime. These advantages are achieved while benefiting from the redundancy and fault localization afforded by the individual operation of each loop, all of whose information is ultimately fed back to the central management unit 8. This is because failure or rupture detection works on the principle presented in the embodiment of FIG. 4. If, for example, a break is detected in the secondary loop B3, it will be located through the responses to the various queries sent by the central management unit 8.

FIG. 6 shows a third example embodiment of the invention, which will only be described in terms of its differences.

In this example, the secondary loop B2 itself carries another level-three loop B22, referred to as rank-three, at a double branch node B2N4, which operates in the same way in relation to its upstream loop B2 as the latter does in relation to its own upstream loop B1.

This secondary loop B2 also carries a sensing line L21 on a single branch B2N3. This takes the form of a single line, terminated by a terminator L21T, for example as shown in FIG. 3.

The other secondary loop B3 itself carries two sensing lines L31 and L32, also referred to as rank-three. The sensing line L32 is a single line comprising a terminator L32T as shown in FIG. 3. The other sensing line L31 is also referred to here as a single line, because it is connected to just one branch port B3N3 of loop B3.

At its downstream end, however, this single sensing line L31 on the loop B3 carries a double branch L31N4, to which the two ends of a rank-four loop B312 are connected, and which operates in a similar way to loops B3 and B22. This single sensing line L31 of the loop B3 also carries two single branches L31N2 and L31N3, to which another loop B311 is connected.

As you can see, each of the higher-ranking structures, whether loop or single line, receives query signals from its lower-ranking structure and passes them on to its next-higher-ranking structure(s), and so on down the line. In the reverse direction, it receives the corresponding response signals from its higher-ranking structure(s) and passes them on to its lower-ranking structure, and so on until these responses reach the central management unit 8. Note that the "ranks" here are defined in ascending order from the central management unit 8.

In the case of a lower-ranking structure formed by a single sensing line, such as the rank-three single sensing line L31, its branches (single or double) are arranged to transmit query signals to the higher-ranking structure in duplicate when connected to a loop, such as the double branch L31N4 which carries the rank-four loop B312. In a similar way, the single branches L31N2 and L31N3 are arranged to receive the query signals that travel along the single sensing line L31, and transmit it to the higher-ranking structure in a split fashion at the two ends of the rank-four loop B311.

Failure or rupture detection works on the principle presented in the embodiment of FIG. 4. If, for example, a break is detected in the secondary loop B3, it will be located through the response signals in response to the various query signals sent by the central management unit 8.

This shows that topologies can be further varied, for example by mixing loops and single lines within a single facility managed by a single central management unit. This makes it easier to adapt the facility to the shape of the area to be monitored, and also to limit the cost and complexity of facilities.

In FIG. 6, note that the central management unit 8 (dotted line) is made up of two sub-units 8A and 8B, each carrying a first and second query or communication port 81, 82. These two sub-units are linked together and/or with a central unit 80, for example via a digital network of a known type, through which the two sub-units transmit their information and/or synchronizations. It is thus possible to create a primary loop B1 whose two ends are more or less distant from each other, while retaining the redundancy and fault location specific to the detection loop.

These embodiments are in no way limiting, and in particular, it is possible to consider variants of the invention that comprise only a selection of the features disclosed hereinafter in isolation from the other features disclosed (even if that selection is isolated within a phrase comprising other features), if this selection of features is sufficient to confer a technical benefit or to differentiate the invention with respect to the prior state of the art. This selection comprises at least one preferably functional feature which lacks structural details, and/or only has a portion of the structural details if that portion is only sufficient to confer a technical benefit or to differentiate the invention with respect to the prior state of the art.

Typically at least one of the means of the system according to the invention previously described, preferably each of the means of the system according to the invention previously described are technical means.

Typically, each means of the system according to the invention previously disclosed comprises at least one computer, a central processing or computing unit, an analog electronic circuit (preferably dedicated), a digital electronic circuit (preferably dedicated), and/or a microprocessor (preferably dedicated), and/or software means.

Of course, the invention is not limited to the examples just described, and many adjustments can be made to these examples without going beyond the scope of the invention.

Of course, the various features, forms, variants and embodiments of the invention may be combined with each other in various combinations as long as they are not incompatible or exclusive of each other. In particular, all the variants and embodiments described above can be combined with each other.

The invention claimed is:

1. A system for detecting leaks of liquid, comprising: a central management unit and a plurality of linear sensors each comprising a first end and a second end and which are connected to one another in series;
   the plurality of linear sensors, connected together, form a linear query bus having a first and a second end;
   for the at least one end of the linear query bus, the central management unit is configured to
       send at least one query signal and receive at least one series of response signals via the at least one end of the linear query bus;
   communication between the linear query bus and the central management unit being two-way;
   the linear query bus being connected to the central management unit by the first and the second ends of said linear query bus;
   and the central management unit being also configured to compare at least one first series of response signals obtained by the first end of the linear query bus with:
       a second series of response signals obtained by the second end of the linear query bus, and/or;
       a list of data representing the plurality of linear sensors, said list being stored by said central management unit;
   the central management unit is configured to identify the presence or absence of a break in one of the linear sensors on the linear query bus from the comparison.

2. The system according to claim 1, characterized in that the system comprises at least one accessory that corresponds to at least one of a derivation, a terminator and a neutral cable.

3. The system according to claim 2, characterized in that the central management unit is configured to compare the first series of response signals obtained comprising data from the first end of the at least one accessory with:
   a list of data that represent the at least one accessory stored by said central management unit, and/or
   a second series of response signals obtained by the second end of the linear query bus, comprising data that represent the at least one accessory.

4. The system according to claim 2, characterized in that the system further comprises at least two derivations, the at least two derivations being connected to the linear query bus, a second linear query bus being formed by a second plurality of linear sensors connected in series with each other, said second linear query bus having a first and a second end and each end being connected to at least one derivation,
   for each end of the second linear query bus, each derivation is configured to:
       send at least one query signal via the second linear query bus and receive at least one response signal from the second plurality of linear sensors via said end,
   each derivation also being configured to transmit the at least one response signal received from the second plurality of linear sensors to the central management unit via the linear query bus.

5. The system according to claim 2, characterized in that the at least one accessory of the system is configured to transmit at least one response signal comprising an item of data specific to said accessory.

6. The system according to claim 1, characterized in that a position of said break of one of the linear sensors of the linear query bus is defined by the central management unit, if the central management unit deduces the presence of a break in one of the linear sensors of the linear query bus depending on the first and second series of response signals received.

7. The system according to claim 1, characterized in that each linear sensor comprises a sensing member sensitive to liquids, said sensing member having a change in resistivity when in contact with said liquid.

8. The system according to claim 1, characterized in that the plurality of linear sensors on the linear query bus corresponds to a plurality of linear sensors sensitive to conductive liquids and/or sensitive to non-conductive liquids and/or sensitive to hydrocarbons.

9. A method for detecting leaks of liquid in a system, the system comprising a central management unit and a plurality of linear sensors each comprising a first end and a second end and which are connected to one another in series,
the plurality of linear sensors, connected together, form a linear query bus having a first and a second end,
for the at least one end of the linear query bus, the method comprising the following steps:
sending at least one query signal via the linear query bus and receiving at least one response signal from the plurality of linear sensors via the at least one end of the linear query bus;
the communication of the linear query bus through the plurality of linear sensors is two-way;
the linear query bus is connected by the first and the second ends to the central management unit;
and the method further comprises the following steps:
comparison by the central management unit of at least a first series of response signals obtained by the first end of the linear query bus with:
a second series of responses obtained from the plurality of linear sensors via the second end of the linear query bus, and/or;
a list of data representing the plurality of linear sensors, said list being stored by said central management unit;
deduction by the central management unit of the presence or absence of a break in the linear query bus.

10. The method according to claim 9, characterized in that the system comprises at least one accessory corresponding to a derivation and/or a terminator and/or a neutral cable, the method comprising the following steps:
comparison by the central management unit of the at least one first series of response signals obtained comprising data from the first end of the at least one accessory with:
a list of data that represent the at least one accessory stored by said central management unit, and/or
a second series of response signals obtained by the second end of the linear query bus, comprising data that represent the at least one accessory.

11. The method according to claim 9, characterized in that the method further comprises the following step:
determination of a position of said break of one of the linear sensors of the linear query bus by the central management unit, if the central management unit deduces the presence of a break in one of the linear sensors of the linear query bus depending on the first and second series of response signals received.

12. The method according to claim 10, characterized in that the system further comprises at least two derivations, the at least two derivations being connected to the linear query bus, a second linear query bus being formed by a second plurality of linear sensors connected in series with each other, said second linear query bus having a first and a second end and each end being connected to least one derivation,
for each end of the second linear query bus and for each derivation, the method comprises the following steps:
sending at least one query signal via the second linear query bus and receiving at least one response signal from the second plurality of linear sensors via said end,
transmitting the at least one response signal received from the second plurality of linear sensors to the central management unit via the linear query bus.

\* \* \* \* \*